(No Model.)
C. COULTHARD.
BUCK RAKE.
No. 507,998.   Patented Nov. 7, 1893.
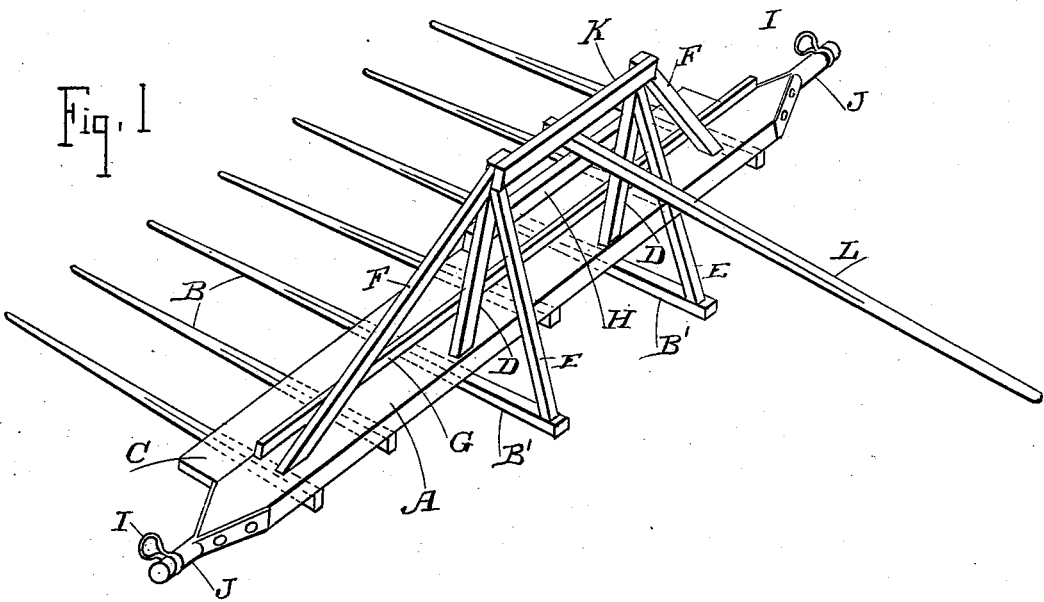
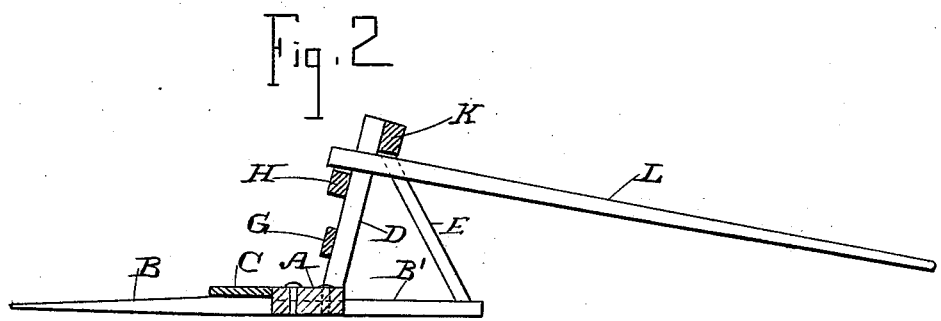
Witnesses,
J. H. Truex
J. A. Bayless
Inventor,
Christopher Coulthard
By Dewey & Co
Att'ys

UNITED STATES PATENT OFFICE.

CHRISTOPHER COULTHARD, OF EMMETT, CALIFORNIA.

BUCK-RAKE.

SPECIFICATION forming part of Letters Patent No. 507,998, dated November 7, 1893.

Application filed June 24, 1892. Serial No. 437,902. (No model.)

*To all whom it may concern:*

Be it known that I, CHRISTOPHER COULTHARD, a citizen of the United States, residing at Emmett, San Benito county, State of California, have invented an Improvement in Buck-Rakes; and I hereby declare the following to be a full, clear, and exact description of the same.

My invention relates to an improved device for raking hay and other similar products; and it consists in certain details of construction which will be more fully explained by reference to the accompanying drawings, in which—

Figure 1 is a perspective view of my improved rake. Fig. 2 is a side view.

The object of my rake is to collect hay, which has first been raked in windrows, into large masses or heaps, and to provide an apparatus by which this can be easily done by a single operator, without excessive labor in handling the rake.

A is the head of the rake which is constructed of sufficiently heavy timber of any suitable or desired length.

B B are the teeth which are bolted or otherwise secured to the rake head, and C is a longitudinal timber extending along over the rear ends of these teeth and just in front of the rake head, and by which they are sufficiently strengthened and braced. Two of these teeth B are extended rearwardly as shown at B'. From the rake head and approximately in line with these two teeth are fixed the inclined back supports D which project upwardly about two feet and have braces E extending down from them to the rear ends of the extensions B'. From the upper ends of the timbers D braces F extend to the ends of the heads A, and the structure is thus rigidly braced and secured.

G is a bar extending horizontally across the front side of the timbers D, crossing also the brace timbers F as shown. Above this is still another bar H extending across the timbers D parallel with the bar G and the head A. These bars serve to stop the hay which is collected upon the teeth B, and prevent its sliding over behind the rake head when the quantity becomes large.

The rake is drawn by means of links I which are fitted upon the projecting ends J of the rake head by grooves or channels, or in any other similar or desired manner. To these, links, chains or draft ropes are attached, and the single or double trees for the horse or team are connected with these draft chains, the horses being connected therewith in any usual manner, and at the same time the harnesses are so connected together as to keep the horses essentially in a line of travel, parallel with the line of the hay which is being raked up, and far enough apart so that they travel upon each side of it and not upon it.

In order to keep the points of the teeth down, so that the hay will be gathered, and not allowed to slide underneath the rake, it is necessary to tilt the head somewhat, and when the rake is full and it is desired to discharge it, it is necessary to have a powerful mechanism by which to reverse the rake and leave the load, while the rake itself is pulled over the top of the load upon the ground and may then again be brought into position for further work.

Across the upper ends of the posts D and behind the posts is fixed a stout transverse bar K. The distance between this bar and the next bar below, H, which is secured to the front of the timbers D, is just sufficient to admit the end of a lever L being inserted between these bars. The leverage is equal to the distance between the bar H in front of the timbers D, and the bar K in rear of them, this distance depending upon the thickness of the timbers D.

It will be seen that when the lever L is raised, the front end presses upon the bar H, while the rear end acts to lift the device by lifting upon the bar K. This lever is of considerable length and the operator can walk at a distance behind the rake which enables him to see if it is taking up all the hay, and if not, by slightly raising the lever, the points of the teeth are depressed so that it will take the whole. When the point is reached where it is desired to discharge the load, the end of the lever L is lifted sufficiently high to cause the teeth B to engage the ground and further draft by the horses upsets the rake and leaves the load.

As soon as the rake commences to turn over, the lever L is released from its position between the bars H and K, because the bar H is in so far in front of the bar K that the rear end of the lever can drop down and become loosened so as to be easily withdrawn. This prevents the bar being carried over which would either break it or the rake head, and the bar can be again introduced into its place as soon as the load has been discharged and the rake is in working position again.

This construction greatly simplifies the heavy and cumbersome rakes which are necessary to handle quantities of hay up to as much as half a ton at once, and enables me to make the whole apparatus strong enough to resist the strains and shocks which occur during its operation.

The rake when separated from the handle passes smoothly over the pile of hay which it has collected, and rounds it up into proper shape.

Having thus described my invention, what I claim as new, and desire to secure by Letters Patent, is—

An improved hay rake consisting of a head with links swiveled upon its ends, teeth fixed to said head and extending forwardly and rearwardly, and a braced frame rising from the head, the forward and rear ends of the teeth and the outer end of the braced frame forming fulcrum points about which the rake may be revolved, the spaced cross bars upon opposite sides of the braced frame, and a removable lever extending rearwardly and having its front end secured between the spaced bars whereby as the rake turns about its fulcrum points the front end of the lever is automatically disconnected, substantially as herein described.

In witness whereof I have hereunto set my hand.

CHRISTOPHER COULTHARD.

Witnesses:
   GEO. H. STRONG,
   S. H. NOURSE.